UNITED STATES PATENT OFFICE.

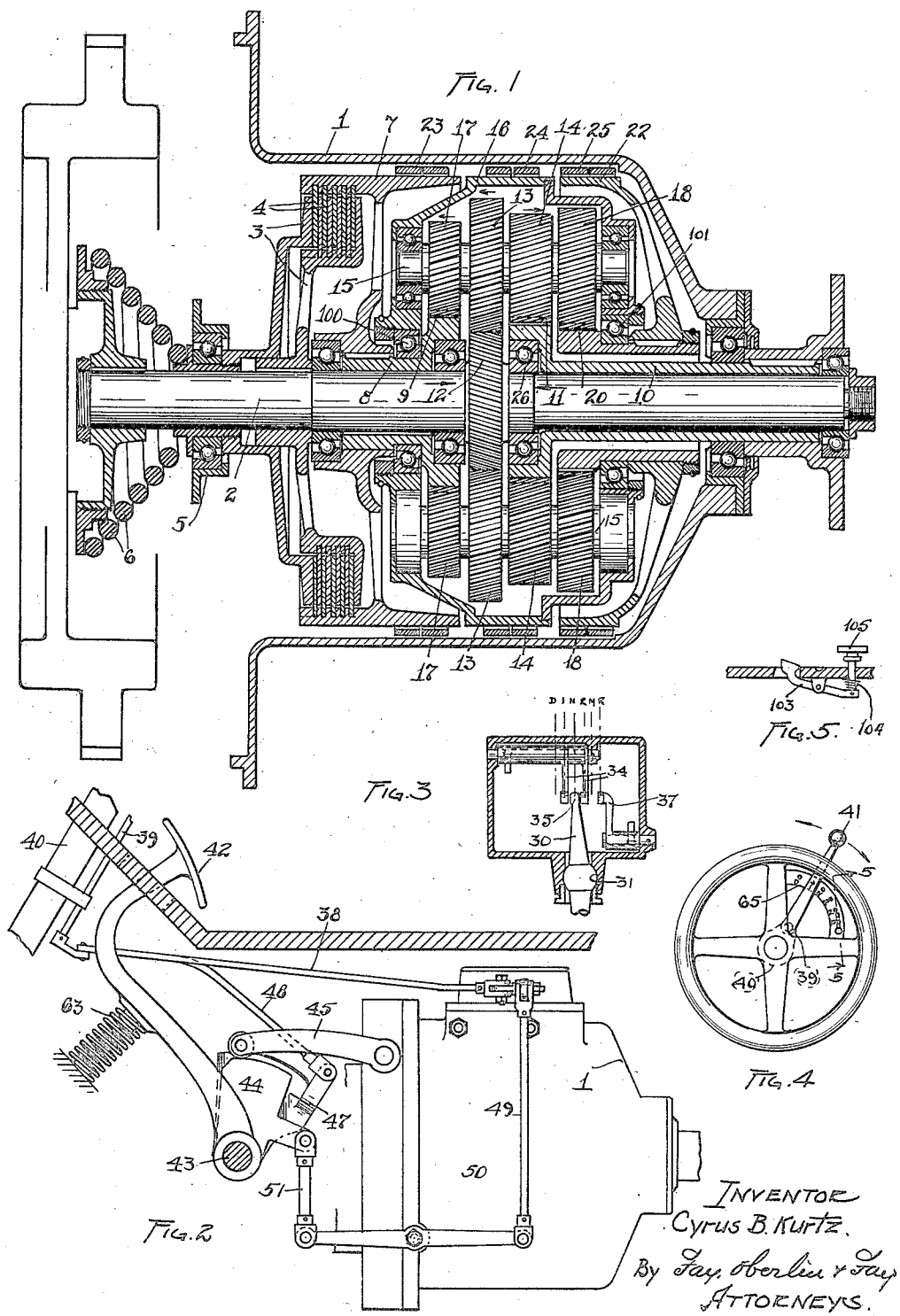

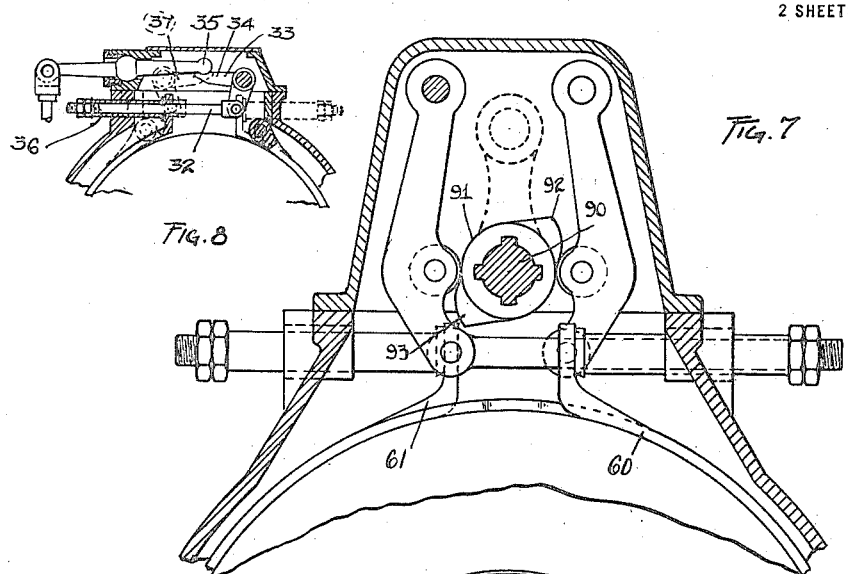
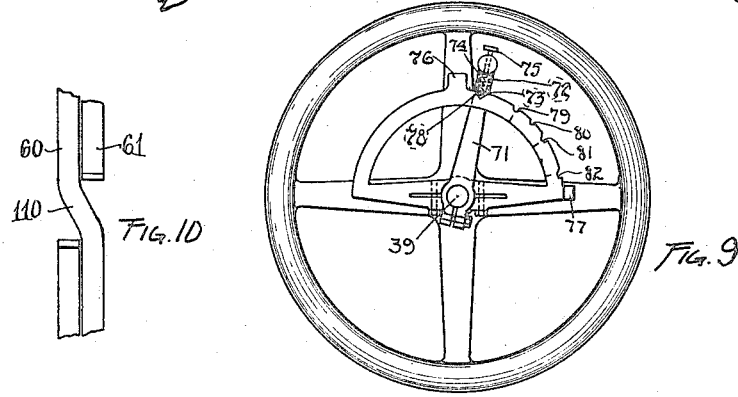
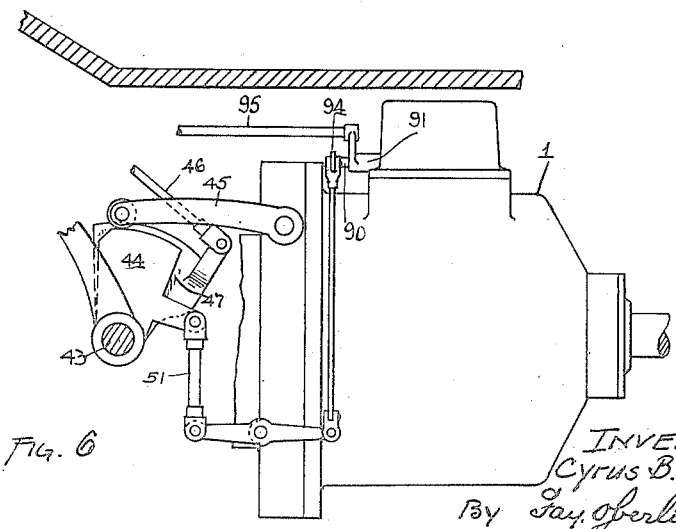

CYRUS B. KURTZ, OF LAKEWOOD, OHIO.

TRANSMISSION MECHANISM.

1,400,687.  Specification of Letters Patent.  Patented Dec. 20, 1921.

Application filed April 29, 1918. Serial No. 231,299.

*To all whom it may concern:*

Be it known that I, CYRUS B. KURTZ, a citizen of the United States, and a resident of Lakewood, county of Cuyahoga, and State of Ohio, have invented a new and useful Improvement in Transmission Mechanism, of which the following is a specification, the principle of the invention being herein explained and the best mode in which I have contemplated applying that principle, so as to distinguish it from other inventions.

The present invention, relating, as indicated to transmission mechanism, is particularly directed to the provision of a variable speed mechanism for the transmission of power for various purposes, such as in motor driven vehicles. One of the objects of the invention is the prevention of the objectionable wear found in the ordinary so-called "sliding transmission" due to improper engagement of the gears. Other objects are improved operating means for a transmission and greater silence of operation. Still further objects will appear from the following description, and while the use of my mechanism in motor vehicles has been specifically referred to, other uses therefor will readily suggest themselves to those skilled in the various arts. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Figure 1 is a longitudinal central section through my improved mechanism; Fig. 2 is a side elevation of the same, showing also the controlling means and connections; Fig. 3 is a plan view of the top of the casing with the cover plate removed to show the clutch operating means; Fig. 4 is a plan view of a steering wheel with my improved type of gear control thereon; Fig. 5 is a side elevation of a detail; Fig. 6 is a view similar to Fig. 2 showing a modified form of my controlling means; Fig. 7 is a transverse section through the top of the transmission casing showing the modified means of Fig. 6; Fig. 8 is a sectional view similar to Fig. 7, but showing the form of controlling means shown in Fig. 3; Fig. 9 is a view similar to Fig. 4, but showing a modification of the invention; and Fig. 10 is a side view of an improved clutch.

The general construction of one form of my invention is best shown in Figs. 1, 2 and 3, in which there is a transmission inclosing casing 1, within which is a concentrically disposed longitudinally extending driving shaft 2 which may be operated from any suitable source of power, such as the crankshaft of an internal combustion engine or the like, if the device is used in a vehicle. Mounted on the shaft 2 are the driving elements 3 of a clutch, preferably of the disk type, engagement of the same with the driven elements 4 being controlled by a spring-pressed plunger 5 disposed about the shaft 2. The clutch 3—4 is normally held in engagement by a spring 6, but may be disengaged by movement of the plunger 5 to the left, which action is secured by a lever 45 to be described presently. The elements 4 of the clutch are mounted in a drum 7 attached to a sleeve 8 rotatably mounted on the shaft 2 and bearing a gear 9 concentric with the shaft.

Mounted in said casing 1 in axial line with said driving shaft 2 is a driven shaft 10 bearing a gear 11, concentric with the gear 9 on the sleeve 8 and adjacent to, and also concentric with a gear 12 on the inner end of the shaft 2. The gears 12 and 11 may be considered as the driving and driven gears, respectively, of the mechanism and they are engaged by gears 13 and 14 respectively on a planet or stub shaft 15 mounted to rotate concentrically about the common axis of the driving and driven shafts in a drum 16 suitably mounted to similarly rotate. The shaft 15 carries other gears 17 and 18, the former in mesh with the gear 9 and the latter with a gear 20, carried on a sleeve 21 mounted within a drum 22, which is rotatably carried on the shaft 10, and adjacent the drum.

The drums 7, 16 and 22 have their outer cylindrical surfaces disposed substantially in alinement, as indicated, and may be engaged and held by means of brake bands 23, 24 and 25, respectively, the operation of which will be presently described. It is not thought necessary to describe in detail the various bearing means in the mechanism as these may take any approved form. Between the gears 11 and 12, however, is disposed a bearing 26, here shown in the form of one type of ball bearing which is adapted also to take axial thrust, this bearing serving to take the axial thrust between these gears 11 and 12.

In my improved transmission I have found it possible to use gears which are in constant and complete engagement, and preferably employ helical gears having the inclination shown, that is the driving and driven gears being of a pitch like a right-hand thread and the gears on the planet shaft, or shafts, as preferably there are two or more of these, being inclined like a left-hand thread. These helical gears produce axial thrust, of course, due to the tooth inclination, these thrusts being indicated as to direction by the small horizontal arrows adjacent the engaging portions of these gears. The gear teeth are so formed as to produce opposite and balancing axial thrusts on the gears 11 and 12, which thrusts are absorbed, as to friction, by the thrust bearing 26. It is important that these thrusts be so directed by the proper arrangement of the tooth angles on the various gears, as to direct the thrusts inwardly toward each other so that they may be balanced and to prevent the action on the casings that would result if the thrusts were directed outwardly.

It is, of course, appreciated that the resultant thrusts on the driving and driven gears may not exactly balance, since the thrust transmitted to the last-named gear will depend on the relative dimensions of the driving, driven and intermediate gears, but with gears of the sizes which will ordinarily be used to give the speed reductions desired for an automobile transmission, for example, the thrusts will nearly balance, and in any event, the unbalanced difference between the opposite thrusts on the driving and driven gears is very much less than even the smaller of the two outward thrusts if they are so directed. Hence the forces acting on the inclosing casings are brought down to extremely low limits, allowing the use of a much lighter case. The unbalanced thrust acts axially against the planet shaft and is taken by the main bearings 100 and 101 for the casing or drum carrying this shaft, although obviously all end thrust can be eliminated by using different angles on the driven gears and the gear driving the same. This angle can be changed to compensate for the differences in gear diameter, and in this way unbalanced axial thrusts can be entirely avoided.

For a direct driving connection between the shafts 2 and 10 the clutch 3—4 is engaged and all of the band brakes 23, 24 and 25 are released, which is the normal condition of the latter. The stub shaft 15 and gears 17 and 13, with the drum 16 also, are then rotated as a unit and the gear 14 thus drives the gear 11 and shaft 10. In this condition the entire mechanism rotates and operates a solid shaft, while the weight of the gears, shafts and drum is sufficient to act as a fly-wheel to some extent.

To secure a lower driving ratio between shafts 2 and 10 the disk clutch 3—4 is disengaged and the drum 7 held by the band 23. This holds the gear 9 immovable, and the drive of the gear 14 by the gear 12 causes the former and the shaft 15 to roll around on the gear 9 and thereby rotate the gear 11 and shaft 10 at a reduced speed which can be calculated, by proper proportioning of the gears, to give a ratio about equal to the intermediate speed usually desired in motor vehicle transmission mechanism.

The lowest speed may be secured by the disengagement of the brake 3—4 and the engagement of the clutch 24 to clutch the drum 16. In this condition the gear 12 is operated to drive the gear 13, and with it the shaft 15 on its axis, and from this shaft, the gear 11 and shaft 10 by means of the gear 14. This lowest speed drive is thus merely a drive to a countershaft and back and the driving ratio will be the ratio between the gears 12, 13, 14 and 11.

To secure a reverse rotation of the driven shaft 10 the brake 3—4 is disengaged and the clutch 25 is engaged to hold the drum 22, and with it the gear 20. The drive is transmitted to the stub shaft 15 in the same manner as before, through the gears 12 and 13, but as the gear 20 prevents rotation of the shaft 15 on its axis if stationary, this shaft and the gears on it must roll around on the gear 20, and will thus drive the gear 11 and the shaft 10 in a reverse direction at a speed determined by the number of teeth in the various gears and by the rolling motion given to the shaft 15 and the gears thereon.

The means for engaging the brake bands 23, 24 and 25 are shown in Fig. 3, and consist primarily of a pivoted lever 30 which is mounted to swing in both a horizontal and a vertical plane by being provided between its ends with a spherical portion 31 received in a suitable socket formed in an extension of the inclosing casing 1. Each of the bands or clutches 23, 24 and 25 has one end fixed to a suitable support within the casing, which is shown in Fig. 8, and has its other or free end mounted on a rod 32 connected to one end of a bell crank lever 33, the other end of which, 34, is positioned adjacent to the inner end 35 of the operating lever 30. Adjustably mounted on the rods 32 are sleeves 36, the position of which may be varied to take up any slack in the clutches 23, 24 and 25. In Fig. 8 the position of the bands 23 and 24 is shown in full lines, while the position of the reverse band 25 and of the lever 37 for operating the same, are shown in dotted lines, the only difference between the forward and reverse bands being that the fixed and movable ends are reversed.

In Fig. 10 I have shown a side view of a preferred type of band which I desire to use in the brakes 23, 24 and 25. In this figure the band is shown as consisting of two relatively narrow thin strips 60 and 61, formed by off-setting one portion 60 from the part 61. This offset portion 110 is disposed at an obtuse angle to the parts 60 and 61 and may be formed by pressing one part away from the other. Such a brake may include two entire convolutions and still take up only the width of two bands and not of three bands, as would be the case if a single continuous strip were wrapped spirally around the drum.

The ends 34 and 37 of the bell crank levers controlling the movement of the bands 23, 24 and 25 are positioned adjacent to one another, as shown in Fig. 5, there being a sufficient space left between each two lever ends to receive therein the engaging end 35 of the operating lever 30. The operating lever 30 is moved in a horizontal plane until it is above the desired lever end and then depressed vertically until it contacts with and moves downward the desired bell crank lever, thus engaging one of the brake bands 23, 24 and 25. If the lever 30 is depressed between the ends of the bell cranks 34 and 37 no brake band is engaged and these intermediate positions may therefore be considered as neutral places in the operation of the transmission.

The outer end of the operating lever 30 is connected by means of a rod 38 with a shaft 39 mounted adjacent and parallel to the steering column 40, this shaft terminating at its upper end in a controlling lever 41, preferably positioned beneath the steering wheel. Mounted adjacent to the steering column 40 is a foot pedal 42, which is pivotally mounted upon an axis 43 and carries on such axis a cam 44. When the foot pedal 42 is depressed the cam 44 causes one end of a lever 45 to be raised and to thus actuate forward or to the left, as shown in Fig. 3, the clutch thrust collar 26, which disengages the direct drive disk clutch. The controlling lever 41 is then moved to such a position that the operating lever 30 is brought over the desired bell crank lever 34 or 37, as the case may be, and the clutch pedal 42 is then permitted to return to its normal position, which is accomplished by the usual clutch spring 63. Connected to the rod 38 is a rod 46, connected to a second cam 47, which also operates on a roller 48 mounted on the end of a clutch lever 45 to hold out of engagement the direct drive clutch during the engagement of any one of the sets of gears. This interlocking mechanism positively prevents the engagement of two different drives between the driving and driven shafts at the same time. The return of the clutch pedal to its normal position, secured by the spring 63, operates to depress the inner end of the lever 30 through the connections 49, 50 and 51. The pedal spring 63 constitutes an auxiliary returning means for the pedal 42, which always operates against this pedal, and which is the sole operating means therefor, when any speed except the direct drive is to be rendered operative, since the interlocking connections prevent operation of the spring 6 during the operation of any of the other speeds.

In Fig. 4 I have shown diagrammatically a quadrant 65 beneath a controlling lever 41, this quadrant being graduated to indicate the different positions and the controlling lever when the transmission operates directly as well as on the intermediate, low and reverse speeds. It will be seen that there are six positions for the controlling lever, marked respectively D, 2, N, 1, N and R. These letters and figures represent direct drive, intermediate speed, neutral position, low speed, neutral position and reverse, respectively. Similar positions are indicated in the same way in Fig. 5. In operating a vehicle having my improved transmission it will ordinarily of course be running with the direct drive engaged and with the controlling lever in the direct position at the lower side of the quadrant 65. In order to engage the second or intermediate speed it is necessary to depress the clutch 42, to shift the controlling lever on to the notch marked 2 and to then permit the clutch pedal to return to its normal position. These actions release the direct drive clutch 3 and hold it disengaged by means of the cam 47, and at the same time shift the operating lever 31 into position above the ends of the bell crank lever 34 controlling the drum 19. As the clutch pedal is returned to its normal position the bell crank lever 34 is depressed by the lever 30 and the band 24 is engaged with the drum 19 which will give the action already described in the transmission casing. To shift to another speed the clutch is again depressed and the control lever may then be shifted to the desired position when the clutch is released and on its return movement engages the desired speed. In cranking the motor the control lever can be shifted to either of the neutral positions, which breaks all connections between driving and driven shafts and permits the driving shaft, which of course is connected to the crank shaft of the engine, to be rotated to start the latter.

The present mechanism constitutes an improved transmission means, the control of which is by means of a single lever which is effectively locked against the engagement at one time of more than one speed. In a sense it is similar to the so-called planetary transmission, although it secures in a very confined space three forward speeds and one reverse, which cannot be secured in the usual planetary transmission, which has in the past been used to some extent in motor driven vehicles.

The present transmission, however, has none of the objectionable noise of the usual planetary transmission when operating in its slow speed because of the helical teeth used on all of the gears, and also because of the relatively low speed of rotation of the planet shafts about the driving and driven shafts. Furthermore, my improved transmission is capable of giving three different speeds, which has not been the case in the planetary transmissions in use in the past, at least in transmissions which include but one set of countershafts as is the case in the present mechanism.

In Fig. 9 I have shown a segment or curved bar 70 mounted on the steering column of an automobile, adjacent to, and below, the steering wheel, and at the center of this segment is mounted a rod 39, to the upper end of which is attached a selecting member 71. This member 71 is provided with a plunger 72 movable longitudinally of the selecting member and provided with an inner tapered end 73. This plunger or latch 72 is normally held in its innermost position in contact with the outer edge of the segment by means of a spring 74, but it may be removed from such contact and pulled outwardly by means of the finger button 75. The selecting member 71 has movement between two stops 76 and 77, and on the segment between these two stops are formed notches 78, 79, 80, 81 and 82. The tapered inner end of the plunger is adapted to engage in these several notches, and when the lever is in such position that the plunger will engage in the notch 78, the member 30 is brought to the direct clutch position. The lever 71 may be readily pulled out of its engagement with the notch 78 and moved along the segment until the plunger engages with the notch 79, from which it is also possible to pull the lever from engagement. Between the notch 79 and the notch 71 is a similar notch which indicates a neutral position, while the notch 81 is deeper than notches 78 or 79 and is provided with a radial or flat rear face which prevents the plunger from being moved farther along the segment in a clockwise direction, unless the plunger is pulled out by means of the button 75. This permits of the convenient operation of the lever 71 between the first speed notch and the direct notch without operation of the plunger, and prevents the accidental movement into reverse, which might happen if it were possible to pull the lever past the first position without disengaging the plunger. To engage or render operative the reverse drive the plunger may be pulled outwardly and the lever moved opposite the first notch when the plunger is released and engages therein. One side of each of the notches 81 and 82 is formed with such an angle that the lever may be pulled up to these notches without operation of the plunger if moved in an upward or counter-clockwise direction. It will be obvious that other types of segments and controlling levers may be used in place of the two described herein, the chief object in designing this feature of the mechanism being simplicity and ease of operation with due regard to the prevention of accidental engagement of the reverse drive.

In Figs. 7 and 8 I have shown a modified type of selecting and operating means, consisting of a shaft 90 rotatably mounted in the upper portion of the casing 1 and disposed longitudinally of the same, that is, in parallelism with the driving and driven shafts. Non-rotatably mounted on this shaft 90, but slidable therealong, is a sleeve 91 provided with a cam 92, which may be moved into any one of the positions which, in the type of mechanism shown in Fig. 3, the outer end of the lever 30 takes, for the purpose of selecting the speed to be engaged when the sleeve 91 and shaft 90 are rocked in such a direction as to cause the cam 92 to engage with the ends of one of the levers 34. The sleeve also bears a second cam 93 disposed on the opposite side of the sleeve from the cam 92 for engagement with the end of the lever 37 for rendering operative the reverse drive. Connected to the shaft 90, externally of the casing 1, is an arm 94, which is connected by means of substantially the same engagement of levers as shown in Fig. 2 to the clutch pedal shaft 43, while the sleeve is similarly connected by means of a rod 95, corresponding to the rod 38, to the shaft 39 mounted along the steering column. The operation of such a controlling system will be readily apparent from the foregoing description, and is similar to the operation of the controlling system previously described and shown in Figs. 2, 3 and 4. The selection of the speed to be rendered operative is made by longitudinal movement of the sleeve 91, to position one of the cams 92 or 93 over the end of the lever controlling the proper clutch band, while the actual operation of the cams to render operative the pre-selected speed is secured by the movement of the clutch pedal as before, which rocks the shaft sleeve and previously positions the cam to engage the proper clutch band.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In transmission mechanism, the combination of an epicyclic gear train comprising co-axial driving and driven gears, mounted adjacent to each other, a thrust bearing mounted between said gears, a planet shaft mounted to revolve concentrically about the common axis of said gears, gears on said planet shaft in mesh with said driving and driven gears, all of said gears having helical teeth arranged to produce inward axial balancing thrusts through said driving and driven gears against said thrust bearing.

2. In transmission mechanism, the combination of alined driving and driven shafts, each bearing gears having teeth inclined in the same direction and at an angle to the direction of rotation of said shafts, a drum rotatably mounted on said shafts, a planet shaft rotatably mounted in said drum and bearing gears engaged with said driving and driven gears, such gears having teeth inclined at an angle to the direction of rotation of said gears, and bearing means for said drum adapted to resist any tendency of said planet shaft and drum to move axially, due to axial thrust caused by operation of said inclined teeth on said gears.

3. In transmission mechanism, the combination of alined driving and driven shafts, each bearing gears having teeth inclined in the same direction and at an angle to the direction of rotation of said shafts, a planet shaft rotatably mounted concentrically about said gears and bearing gears engaged with said driving and driven gears, bearing means interposed between said shafts and adapted to resist axial thrust therebetween, and other bearing means adapted to resist axial thrust along said planet shaft.

4. In transmission mechanism, the combination of an epicyclic gear train comprising co-axial driving and driven gears, a planet shaft mounted to revolve concentrically about the common axis of said gears, gears on said planet shaft in mesh with said driving and driven gears, said driving and driven gears having right-hand helical teeth, and said planet shaft gears having left-hand helical teeth, all said gears being arranged to transmit substantially equal opposite axial thrusts to said driving and driven gears, a casing mounted about said driving and driven gears and said planet shaft and gears thereon, and said casing being adapted to resist any unbalanced axial thrust between said driving and driven gears.

5. In transmission mechanism, the combination of an epicyclic gear train comprising co-axial driving and driven gears, a planet shaft mounted to revolve concentrically about the common axis of said gears, gears on said planet shaft in mesh with said driving and driven gears, said driving and driven gears having right-hand helical teeth, and said planet shaft gears having left-hand helical teeth, all said gears being arranged to transmit substantially equal opposite axial thrusts to said driving and driven gears, a relatively thin drum rotatably mounted about said driving and driven gears and said planet shaft and gears thereon, said planet shaft being rotatably mounted in said drum, and said drum being adapted to resist any unbalanced axial thrust between said driving and driven shafts.

6. In transmission mechanism, the combination of an epicyclic gear train comprising driving and driven shafts supported one within the other, bearings adapted to receive longitudinal thrust interposed between said shafts, a planet shaft mounted to revolve concentrically about the common axis of said gears, gears on said planet shaft in mesh with said driving and driven gears, and all of said gears having helical teeth arranged to balance the axial thrust between said gears within the same.

Signed by me this 1st day of April, 1918.

CYRUS B. KURTZ.